United States Patent [19]

Swanson

[11] 4,414,385

[45] Nov. 8, 1983

[54] CONCRETE COMPRISING SULFUR, CYCLOPENTADIENE OLIGOMERS, AGGREGATE AND GLASS FIBERS

[75] Inventor: Harold V. Swanson, Sparta, N.J.

[73] Assignee: GHA Lock Joint, Inc., Wharton, N.J.

[21] Appl. No.: 356,972

[22] Filed: Mar. 11, 1982

[51] Int. Cl.³ .................. C08G 75/00; C08L 81/00
[52] U.S. Cl. ................................ 524/494; 524/609; 528/389
[58] Field of Search ............... 528/389; 524/494, 609

[56] References Cited

U.S. PATENT DOCUMENTS 4,311,826  1/1982  McBee et al. ............... 528/389
4,348,313  9/1982  McBee et al. ............... 528/389

OTHER PUBLICATIONS

Encyclopedia of Polymer Science and Technology (1966), vol. 4, pp. 563-567.

*Primary Examiner*—Harold D. Anderson
*Attorney, Agent, or Firm*—Charles E. Baxley

[57] ABSTRACT

A sulfur concrete coating composition is disclosed containing 77-88 weight percent sulfur, 3-10 weight percent DCPD (dicyclopentadiene) and oligomer of cyclopentadiene, 1-15 weight percent of mineral aggregate material and 0-5 weight percent of glass fibers having a length of between ½ and 1½ inches. The composition is useful as a resistant liner to protect pipes and other structures from corrosion and chemical attack.

4 Claims, No Drawings

CONCRETE COMPRISING SULFUR, CYCLOPENTADIENE OLIGOMERS, AGGREGATE AND GLASS FIBERS

BACKGROUND OF THE INVENTION

The present invention relates to sulfur modified cements used as a lining material for concrete structures, especially sewage conduits fabricated from conventional concrete compositions.

Recently there has developed an oversupply of elemental sulfur due to increased use of pollution abatement systems which remove $SO_2$ from stack gases. As a result research efforts have been devoted to finding new uses for elemental sulfur especially in areas where energy intensive materials can be replaced.

One area that has gained considerable attention is the manufacture and use of sulfur concrete. Sulfur concretes are basically made by mixing sulfur with certain additives (e.g. mineral aggregates and binders). The resulting product is characterized by high strength and excellent resistance to corrosive materials such as inorganic acids and salts (see generally, *Sulfur Research and Development,* Volume 2, 1979).

One of the major problems associated with sulfur concretes is their lack of durability and the difficulty in controlling production of the final product. An attempt to overcome this problem is disclosed in *Bureau of Mines Report of Investigations,* RI8545, 1981. DCPD (dicyclopentadiene) is combined with an oligomer of cyclopentadiene (CPD) to provide a binder which controls the exothermic reaction of DCPD and sulfur resulting in a durable product under controlled conditions. Also disclosed in this reference is the use of aggregate materials such as limestone, quartz and silica and glass fibers having a length up to ¼ inch.

Another problem with sulfur concretes is their high cost. Under present conditions, sulfur concrete will cost about 30% to 100% more than comparable Portland Cement concretes.

Accordingly, it is an object of the present invention to provide a lining material for concrete structures which is durable and highly resistant to corrosive materials and is less expensive to use than sulfur concrete.

THE INVENTION

The present invention is directed to an improved sulfur concrete composition particularly suited to be used as a lining material in sewage containing conduits due to its superior resistance to chemical attack.

The composition comprises 77–88% sulfur, 3–10% of the combination of DCPD and oligomer of CPD, 1–15% of one or more mineral aggregates such as, for example, limestone, quartz, silica, mica, basalt and fiberglass and from 0–5% of glass fibers having a length of between ½ and 1½ inches. All percentages set forth in the application refer to percentage by weight unless otherwise noted.

The sulfur employed in the present invention is preferably commercial grade sulfur (~99.9% purity) but may include impurities up to 10%. The binder is a combination of DCPD and oligomers of CPD in a weight ratio of preferably between 65–50:35–50. Highly pure DCPD (97% purity) is preferably employed in the composition but commercial grade DCPD (77–80% purity) may also be used.

The oligomer may be obtained as a by-product from the production of DCPD resin. The oligomer starting material will contain varying percentages of CPD and corresponding dimer through pentamer forms of the compound in addition to small amounts of higher polymers. For example, a typical oligomer starting material may contain 5% CPD, 10% each of dimer and trimer, 20% tetramer, 45% pentamer and 10% traces of higher polymers such as alkyl napthalenes and of vinyl DCPD aromatic copolymers.

Reaction between sulfur and DCPD to form modified sulfur cement must be carefully controlled under elevated temperatures (i.e. above 120° C.) to prevent depolymerization of DCPD which can result in a viscous unworkable mass of concrete. Oligomer of CPD is used to control the rate of reaction and thereby reduce depolymerization of DCPD. As a result the linear polymeric polysulfides formed provide a much usuable cement composition.

The reaction between sulfur and the combination of DCPD and oligomer is conducted at a temperature of typically between 120° C. and 180° C. for sufficient time to complete the reaction which is usually in the range of between 4 and 48 hours.

Mineral aggregates are used in the present composition to increase the strength of the sulfur lining and to increase resistance to acid and salt attack. Typical aggregate materials include limestone, quartz, mica, basalt, silica and the like. Limestone is particularly suitable for increasing the compressive, tensile and flexural strength of the sulfur concrete while quartz, basalt and mica are especially good at increasing acid and salt resistance.

Generally, coarse and fine aggregates may be combined to form, with the modified sulfur, a lining material which has a low void content. It is desirable to obtain a sulfur concrete lining material which has less than 5% voids. As a result, the moisture absorption of the material is kept to 0.05% or less which is important in keeping resistance to corrosion at a high level.

In order to accomplish this result it is desirable to use an aggregate material wherein at least 6% and up to 20% of the particles are between 150 and 250 mesh.

Glass fibers are advantageously incorporated into the sulfur concrete lining material to increase strength and to prevent chipping and flaking. It has also been determined that the glass fibers between ½ and 1½ inches provide the optimum results when used in an amount up to 5%.

The composition of the present invention may be applied to the surface of concrete structures in a conventional manner such as by spraying or brushing.

The following examples are for illustrative purposes only and are not meant to limit the invention as disclosed and claimed in the application as a whole.

EXAMPLE 1

Formation of a sulfur lining material containing 80% sulfur, 8% limestone, 6.5% DCPD, 3.5% oligomer of CPD AND 2% glass fibers having an average length of ¾ inches was prepared in the following manner:

1000 grams of commercial grade sulfur is heated to between 135° C. and 140° C. until the sulfur melts. 43.75 g of oligomer is added in three approximately equal doses. Each addition causes the reaction temperature to drop about 10° to 15° C. The reaction continues until the temperature rises to 135°–140° at which time the second dose of oligomer is added.

81.25 g of commercial grade DCPD is added in two approximately equal doses. Each dose results in a slight increase in the reaction temperature which stabilizes after the reaction is completed. The total reaction time is approximately 30 hours.

The thus prepared modified sulfur is heated to a temperature of between 130° and 150° C. and is combined with 100 g of limestone, of which 10 g is 200 mesh, heated to the same temperature. The components are mixed for several minutes and then 25 g of glass fibers having an average length of ¾ inches are added. The resulting mixture is sprayed on the interior surface of a concrete pipe and allowed to dry.

EXAMPLE 2

The same procedure as EXAMPLE 1 is followed using 1000 g of sulfur, 29.75 of each of DCPD and oligomer, 83.3 g of limestone and 47.5 g of glass fibers having an average length of 1.25 inches to produce a sulfur lining composition composed of 84% sulfur, 2.5% of DCPD and oligomer, 7% of limestone and 4% glass fibers.

EXAMPLE 3

The sample procedure as EXAMPLE 1 is followed using 1000 g of sulfur, 35.7 g of DCPD, 25.6 g of oligomer, 192 g of quartz and 25.6 g of glass fibers having an average length of ¾ inches to produce a sulfur lining composition composed of 78% sulfur, 3% DCPD, 2% oligomer, 15% of quartz and 2% glass fibers.

EXAMPLE 4

The same procedure as Example 1 is followed using 1000 g of sulfur, 30.5 g of DCPD, 30.8 g of oligomer, 134.1 g of silica and 48.8 g of glass fibers having an average length of 1¼ inches to produce a sulfur lining composition composed of 82% sulfur, 2.5% DCPD and oligomer, 11% silica and 4% glass fibers.

I claim:

1. A sulfur concrete coating composition comprising 77-88 weight percent sulfur, 3-10 weight percent of the combination of dicyclopentadiene and an oligomeric mixture of at least trimers of cyclopentadiene, 1-15 weight percent of at least one mineral aggregate material selected from the group consisting of limestone, quartz, silica, mica, basalt and fiberglass, and between 2 and 5 weight percent of glass fibers having a length between ½ and 1½ inches.

2. The composition of claim 1 wherein between 6 and 20% of said material is between 150 and 250 mesh.

3. The composition of claim 1 wherein said glass fibers are present in an amount between 2 and 4 weight percent.

4. The composition of claim 1 wherein the weight ratio of dicyclopentadiene to said oligomeric mixture is in the range of 65-50:35-50.

* * * * *